UNITED STATES PATENT OFFICE

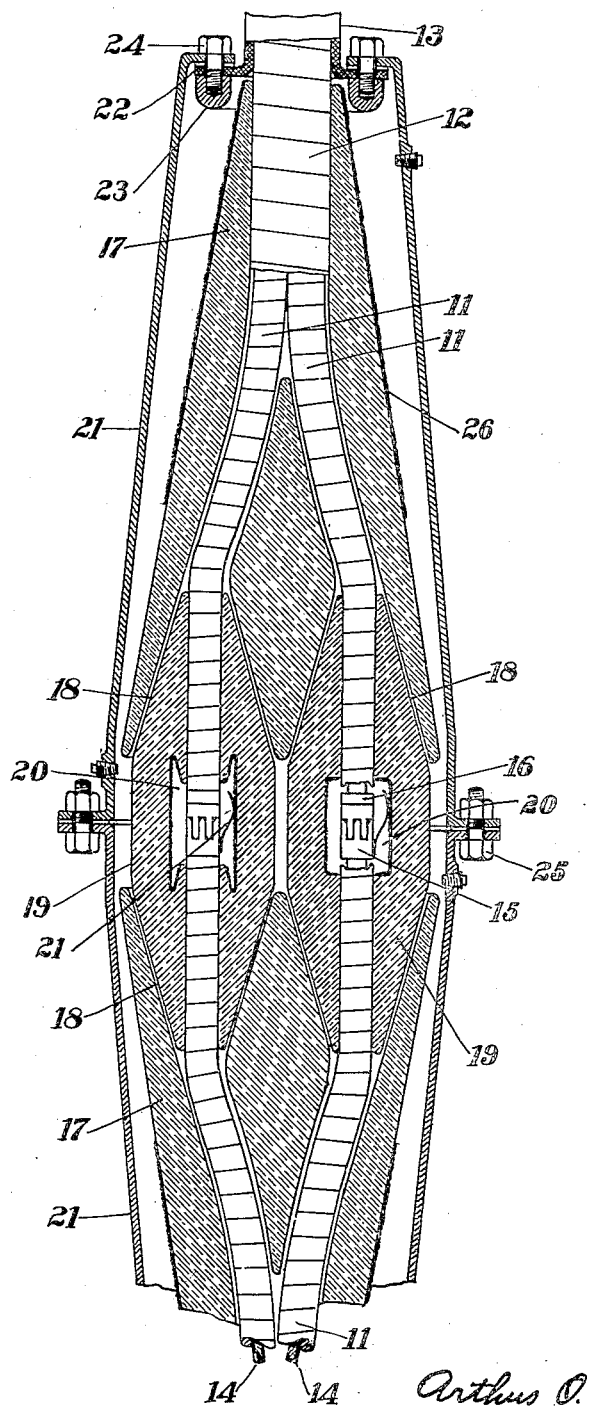

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR MULTIPLE-CONDUCTOR HIGH-TENSION CABLES

Application filed March 16, 1927, Serial No. 175,658. Renewed May 15, 1928.

This invention relates to means for uniting adjacent ends of cable sections having a plurality of conductors for carrying high potential currents and has for its object the provision of means for joining the ends of the cable sections which may be conveniently installed and which will, when installed have as efficient characteristics as the main body of the conductor cable. Other specific objects will appear from the following description and claims.

The invention is exemplified in the combination and arrangement of parts shown in the accompanying drawing and described in the following specification and it is more particularly pointed out in the appended claims.

In the drawing—

The figure is a longitudinal section of a cable joint showing one embodiment of the present invention by way of illustration.

In multiple conductor high tension cables, considerable difficulty is encountered in providing an efficient joint for connecting up the various lengths of cable. This is particularly true where there are several conductors making up the cable as space must be econmized. The cable usually consists of several conductors each covered with a layer 11 of insulation, the several conductors being surrounded by an additional layer of insulation 12 and a lead sheath 13. The conductors 14 are attached to complementary terminal members 15 and 16 which will make good electrical contact when shoved together. The improved joint consists essentially of two insulating branch block members 17 with conical holes 18 around the openings for the individual conductors. The insulating members 19 have conical ends that fit into the conical pockets 18 of the branch blocks. The insulating members 19 may have recesses 20 which have insulated control pockets to prevent charging current from flowing over the surface of the conductor. Contact is made between the complementary members and the metalized pockets 20 by means of the spring 21' or other suitable means. To make up the joint, the lead sheath is stripped the required distance of the outer layer of insulation 12 so that the several cables can be separated. The terminal members 15 and 16 are then attached to the metallic conductors inside the individual cable. The several parts are measured so that all parts will be in proper position when final assembly is made. The outer cases 21 are slipped back over the cable and the lead sheath flared outwardly as at 22. The clamping ring 23 is then shoved over the end of the cable after which the insulating block 17 may be shoved into place. The several cables are threaded through the proper openings as the block 17 is shoved into place. When both insulating blocks are in place the insulating members 19 may be threaded over the ends of the cables on one side of the joint and the cables inserted in the other ends. The flanged lead sheath may then be clamped tightly between the cover piece 21 and the clamping ring 22 by the bolts 24. The two portions of cable may then be drawn together by the bolts 25. This will cause the complementary fittings 15 and 16 to mesh. The outer surface of the members 17 is preferably metalized and placed in electrical contact with the cover members 21 or the cable sheath. Where there is considerable space between the cover 21 and the insulating members, only a portion of the outer surface needs to be metalized providing this portion is located at the end where the cable enters as shown by 26. The use of material having a rather high specific inductive capacity such as porcelain facilitates the design greatly as the tendency for charging current to flow along the joints is reduced for a given contour, that is, as against the use of material having a low specific inductive capacity.

I claim—

1. The combination with adjacent ends of multiple conductor cables having the contuctors thereof separately insulated, of distributing blocks of dielectric material for each of said cable ends having higher specific inductive capacity than the insulating material surrounding said conductors, coupled members for connecting the ends of the separate conductors and sleeves of dielectric material bridging the space between said distributing blocks and surrounding the connected portions of said conductors.

2. The combination with adjacent ends of multiple conductor cables having the conductors thereof separately insulated and having metal sheaths surrounding said cable, of distributing blocks having branch passages for separating the conductors of said cable couplers for uniting the ends of complementary conductors, sleeves of dielectric material bridging the space between the ends of said distributing blocks and surrounding said couplers and the connected ends of said conductors and a housing member enclosing said distributing blocks and sleeves, said housing member being joined at its opposite ends to said metal sheaths.

3. The combination with adjacent ends of multiple conductor cable sections having separately insulated conductors and metal sheaths on the outer surfaces of said cable sections, of distributing blocks of dielectric material having higher specific inductive capacity than the insulating cover for said conductors, said distributing blocks being tapered and having branch passages for separating the conductors of said cable sections, the adjacent ends of the passages through said distributing blocks being flared outwardly and sleeves of dielectric material having tapered portions disposed within the flared ends of said branch passages to form connections for said branch passages.

4. The combination with adjacent ends of multiple conductor cable sections having separately insulated conductors and metal sheaths surrounding said cable sections, of distributing blocks of dielectric material having higher specific inductive capacity than the covering for said conductors, said distributing blocks having branch passages therethrough for separating said conductors, the adjacent ends of said branch passages being flared, dielectric sleeves having tapered ends fitting into said branch passages and joining the passages of the distributing blocks and couplers on the ends of said conductors for uniting the several conductors within said dielectric sleeves.

5. The combination with adjacent ends of multiple conductor cable sections having the conductors thereof separately insulated and having metal sheaths, of distributing blocks of dielectric material of greater specific inductive capacity than the insulation surrounding said conductors, said blocks having branch passages for separating the conductors of said cables, dielectric sleeves having their ends registering with the ends of the branch passages of said distributing blocks and uniting said passages, couplers on the ends of said conductors for joining said conductors within said sleeves and a housing member having its opposite ends connected to the ends of said sheaths and enclosing said distributing blocks and sleeeves, said housing member being made in separable sections to facilitate assembling.

6. The combination with adjacent ends of multiple conductor cable sections having separately insulated conductors and outer metal sheaths, of distributing blocks of dielectric material having higher specific inductive capacity than that of the insulation surrounding said conductors, said blocks having branch passages therethrough for separating the conductors of said cables, sleeves of dielectric material having the ends thereof inter-fitting with the ends of said branch passages, couplers on the ends of said conductors uniting the complementary conductors within said sleeves, said sleeves having flux control pockets surrounding said couplers, a conductor coating on the outer surface of said distributing blocks and a split housing member enclosing said distributing blocks and sleeves and having the opposite ends thereof secured to the ends of said metal sheaths, said housing member having an opening for the introduction of an insulating compound into said housing.

In testimony whereof I have signed my name to this specification on this 12th day of March A. D. 1927.

ARTHUR O. AUSTIN.